US012459012B2

(12) United States Patent
Raposo et al.

(10) Patent No.: US 12,459,012 B2
(45) Date of Patent: Nov. 4, 2025

(54) VIBRATING LIQUID DISINFECTANT CONTAINER

(71) Applicant: CONAIR LLC, Stamford, CT (US)

(72) Inventors: Jason Gil Raposo, Durham, CT (US); James Vito Carlucci, Stratford, CT (US); Dennis Colpitts, Fairfield, CT (US); Sergio Lopes Fernandes Da Costa, Danbury, CT (US)

(73) Assignee: CONAIR LLC, Stamford, CT (US)

( * ) Notice: Subject to any disclaimer, the term of this patent is extended or adjusted under 35 U.S.C. 154(b) by 249 days.

(21) Appl. No.: 18/067,955

(22) Filed: Dec. 19, 2022

(65) Prior Publication Data

US 2024/0198394 A1 Jun. 20, 2024

(51) Int. Cl.
*B08B 3/12* (2006.01)
*A45D 24/44* (2006.01)

(52) U.S. Cl.
CPC ................ *B08B 3/12* (2013.01); *A45D 24/44* (2013.01)

(58) Field of Classification Search
CPC .. B08B 3/12; B08B 3/10; B08B 13/00; B08B 3/048; B08B 7/028; B08B 2209/005; B08B 3/08; A61L 2/24; A61L 2/025; A61L 2/10; A61L 2202/24; A61L 2202/122; A61L 2202/14; A61L 12/026; A61L 12/06; A61L 2202/17; A61L 12/063; A61L 12/086; A61L 2/0047; B06B 2201/71; A45D 24/44; A45D 27/46
See application file for complete search history.

(56) References Cited

U.S. PATENT DOCUMENTS 2,724,393 A 11/1955 Heise
2,994,330 A * 8/1961 Catlin .................... A45D 24/44 134/107

(Continued)

FOREIGN PATENT DOCUMENTS

CN 107803364 A 3/2018
CN 209361396 U 9/2019

(Continued)

OTHER PUBLICATIONS

Machine translation of KR-200348537-Y1 (Year: 2004).*

(Continued)

*Primary Examiner* — Michael E Barr
*Assistant Examiner* — Thomas Bucci
(74) *Attorney, Agent, or Firm* — Ruggiero McAllister & McMahon LLC

(57) ABSTRACT

A disinfectant liquid cleaning box is provided that includes a box having an interior space formed therein to received contents to be cleaned and a cleaning liquid, an opening at the top of the box in communication with said interior space, a cover rotatably connected to the box and adapted to be selectively moved between an opened position and a closed position in order to open and close the interior space of the box, a vibration motor connected to the box for causing vibration of said cleaning liquid, a light connected to the box, and a controller that controls a predetermined cycle to activate the vibration motor for a first predetermined time to disinfectant contents to be cleaned that are placed in the interior space of the box and to activate the light for a second predetermined time.

20 Claims, 6 Drawing Sheets

(56) References Cited

U.S. PATENT DOCUMENTS

| | | | | | |
|---|---|---|---|---|---|
| 3,113,761 | A | | 12/1963 | Platzman | |
| 3,180,626 | A | | 4/1965 | Mettler | |
| 3,392,964 | A | | 7/1968 | Krolik et al. | |
| 3,406,696 | A | * | 10/1968 | Macchesney | G02C 13/006 15/310 |
| 3,480,258 | A | * | 11/1969 | Massa | B08B 3/12 366/115 |
| 3,516,645 | A | | 6/1970 | Arndt | |
| 3,851,861 | A | * | 12/1974 | Cummins | B08B 3/12 366/127 |
| 3,937,236 | A | * | 2/1976 | Runnells | B08B 3/12 134/182 |
| 4,806,770 | A | * | 2/1989 | Hylton | A47K 1/09 250/455.11 |
| 4,870,982 | A | * | 10/1989 | Liu | A47L 25/00 366/127 |
| 4,888,487 | A | * | 12/1989 | Ritter | A61L 2/10 250/455.11 |
| 4,911,190 | A | * | 3/1990 | Sheldon | B08B 3/044 134/158 |
| 5,023,460 | A | * | 6/1991 | Foster, Jr. | A61L 2/10 250/455.11 |
| 5,029,252 | A | * | 7/1991 | Ameseder | A61L 2/10 250/455.11 |
| 6,183,705 | B1 | * | 2/2001 | Chang | G02C 13/008 422/301 |
| 6,390,104 | B1 | * | 5/2002 | Gagnon | A61C 17/036 134/107 |
| 6,461,568 | B1 | * | 10/2002 | Eckhardt | A61L 2/10 250/455.11 |
| 8,685,318 | B2 | | 4/2014 | Collard et al. | |
| 9,420,942 | B2 | * | 8/2016 | Taya | A61B 1/123 |
| 9,550,215 | B2 | | 1/2017 | Myers | |
| 9,782,803 | B2 | * | 10/2017 | Semans | B08B 3/04 |
| 11,000,612 | B1 | * | 5/2021 | He | A61L 2/202 |
| 11,167,323 | B2 | * | 11/2021 | Semans | B08B 3/02 |
| 2004/0025899 | A1 | * | 2/2004 | Pinsky | A45D 44/18 132/310 |
| 2004/0123885 | A1 | * | 7/2004 | Myong | B08B 9/28 134/179 |
| 2004/0182414 | A1 | | 9/2004 | Puskas | |
| 2008/0099055 | A1 | * | 5/2008 | Lemley | A47L 15/0089 134/33 |
| 2009/0256085 | A1 | * | 10/2009 | Thiruppathi | A61L 2/10 250/492.1 |
| 2010/0326484 | A1 | * | 12/2010 | Wu | A61L 2/24 134/140 |
| 2011/0192431 | A1 | * | 8/2011 | Semans | B08B 3/04 134/166 R |
| 2012/0216838 | A1 | * | 8/2012 | Semans | B08B 3/10 134/25.1 |
| 2022/0096692 | A1 | * | 3/2022 | Dutra | A61L 2/10 |
| 2022/0370654 | A1 | * | 11/2022 | Ting | A61L 2/025 |

FOREIGN PATENT DOCUMENTS

| | | | | | |
|---|---|---|---|---|---|
| CN | 113198798 | A | | 8/2021 | |
| CN | 113477585 | A | | 10/2021 | |
| KR | 200348537 | Y1 | * | 4/2004 | A61L 12/063 |
| KR | 10-2021-0133509 | A | | 11/2021 | |

OTHER PUBLICATIONS

International Search Report dated Feb. 9, 2024 from corresponding International Patent Application No. PCT/US2023/080104, 10 pages.

Written Opinion dated Feb. 9, 2024 from corresponding International Patent Application No. PCT/US2023/080104, 7 pages.

International Preliminary Report on Patentability dated Nov. 26, 2024 from corresponding International Patent Application No. PCT/US2023/080104, 17 pages.

* cited by examiner

VIBRATING LIQUID DISINFECTANT CONTAINER

BACKGROUND

1. Field of the Invention

The present disclosure relates to disinfecting tools, for example, tools for cutting hair. In particular, the present disclosure relates to a disinfecting container for tools for cutting hair by use of a vibrating liquid disinfectant container.

2. Description of Related Art

Typically tools for cutting hair, also known as barber tools, are disinfected by submerging them in disinfecting liquid stored in a container. However, some dirt particles, hair, grime, and other foreign particles can undesirably remain on the tools even after being submerged in the disinfecting liquid requiring the tools to be further disinfected and/or cleaned.

Accordingly, it has been determined that there is a continuing need for a device that overcomes, alleviates, and/or mitigates one or more of the aforementioned and other deleterious effects of prior devices.

SUMMARY

A disinfectant liquid cleaning container or box is provided that is fillable with a disinfectant liquid and vibrates to enhance cleaning.

The disinfectant liquid cleaning container generates sonic vibrations to help release dirt particles, hair, grime, and other foreign particles.

The disinfectant liquid cleaning container also has a light emitting diode ("LED") illuminated during the cleaning cycle.

The cleaning cycle can be activated automatically when the disinfectant liquid cleaning container moves from an opened position to a closed position.

Once the disinfectant liquid cleaning container moves from an opened position to a closed position, the cleaning cycle is deactivated automatically.

A disinfectant liquid cleaning box is provided that includes a box having an interior space formed therein to received contents to be cleaned and a cleaning liquid, an opening at the top of the box that is in communication with said interior space, a cover rotatably connected to the box and adapted to be selectively moved between an opened position and a closed position in order to open and close the interior space of the box, a vibration motor connected to the box for causing vibration of said cleaning liquid, a light connected to the box, and a controller that controls a predetermined cycle to activate the vibration motor for a first predetermined time to disinfectant contents to be cleaned that are placed in the interior space of the box and to activate the light for a second predetermined time.

The above-described and other features and advantages of the present disclosure will be appreciated and understood by those skilled in the art from the following detailed description, drawings, and appended claims.

DETAILED DESCRIPTION

Figure 1:
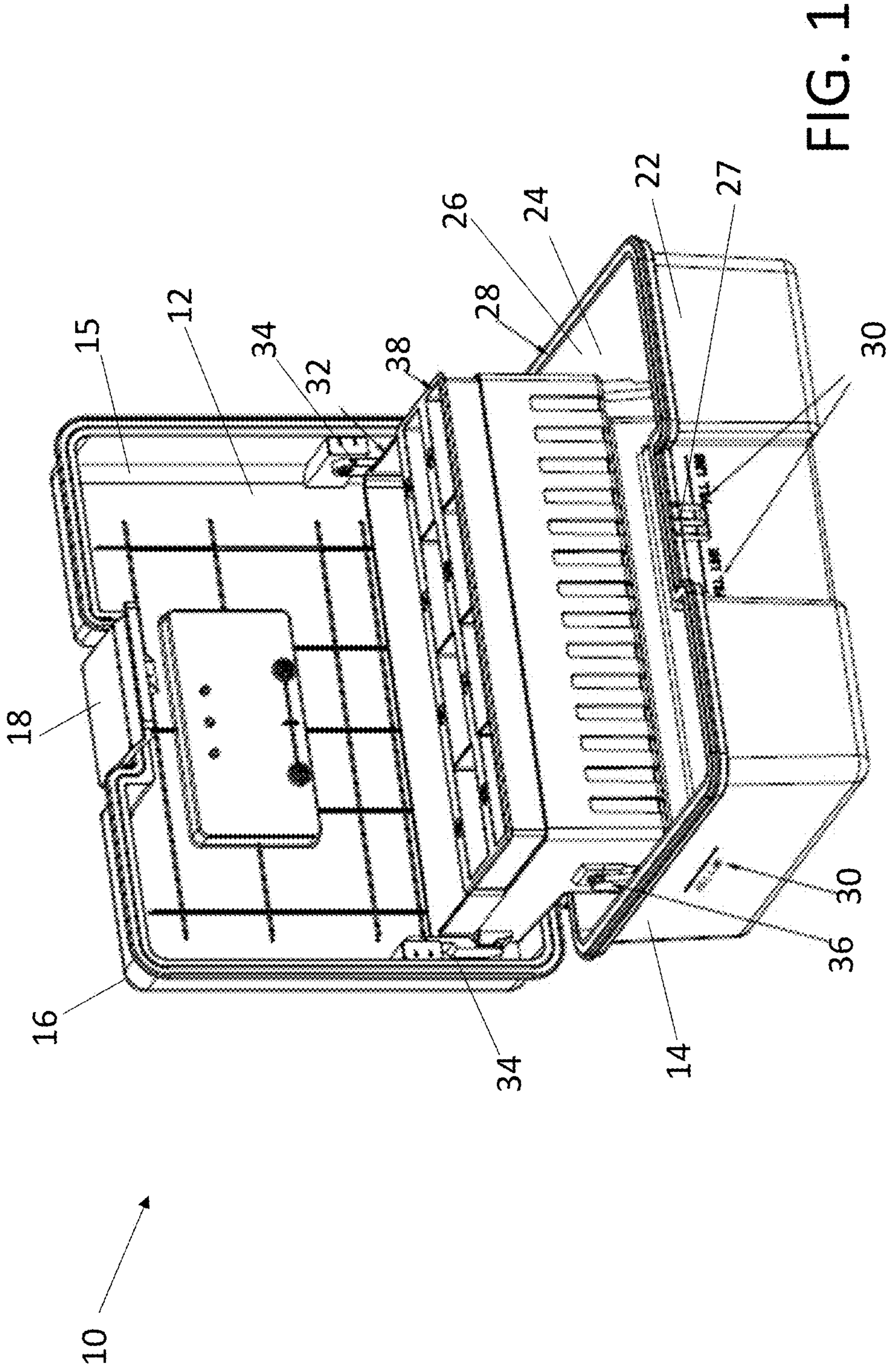
FIG. 1 is a front perspective view of a vibrating liquid disinfectant container according to the present disclosure in an opened position.

Referring to the drawings and in particular to FIG. 1, an exemplary embodiment of a vibrating liquid disinfectant container according to the present disclosure is shown and is generally referred to by reference numeral 10 ("container 10"). Advantageously, container 10 is a disinfectant liquid cleaning box. Container 10 is fillable with a disinfectant liquid (of a type known in the art, for example, Barbicide® concentrate or other disinfectant liquid) and vibrates to enhance cleaning. Container 10 generates sonic vibrations to help disinfect guards, blades, shears and combs by releasing dirt particles, hair, grime, and other foreign particles. Container 10 preferably has a light, for example, a light emitting diode ("LED"), illuminated cleaning cycle. The cleaning cycle can be automated so that the cleaning cycle is activated automatically when container 10 moves from an opened position, as shown in FIG. 1, to a closed position, as shown in FIG. 3, and once completed, then the cleaning cycle is deactivated automatically.

Referring to FIG. 1, container 10 has a cover 12 rotatably connected to a box 14. Cover 12 has an interior surface 15 opposite an exterior surface 16. A latch 18 is connected to exterior surface 16 of cover 12. Box 14 has an outer surface 22 opposite an inner surface 24 that surrounds an interior volume 26. Box 14 has a gasket 28 connected to a rim that surrounds an opening into interior volume 26 and a ridge 27 on outer surface 22 adjacent gasket 28. Indicia 30 are on outer surface 22 and/or inner surface 24 of box 14. A basket carriage 32 is connected to interior surface 14 of cover 12 by hinges 34 and inner surface 24 of box 14 by hinges 36 to extend into interior volume 26. An accessories basket 38 is removably insertable in basket carriage 32. Cover 12 and box 14 can be translucent.

Figure 2:
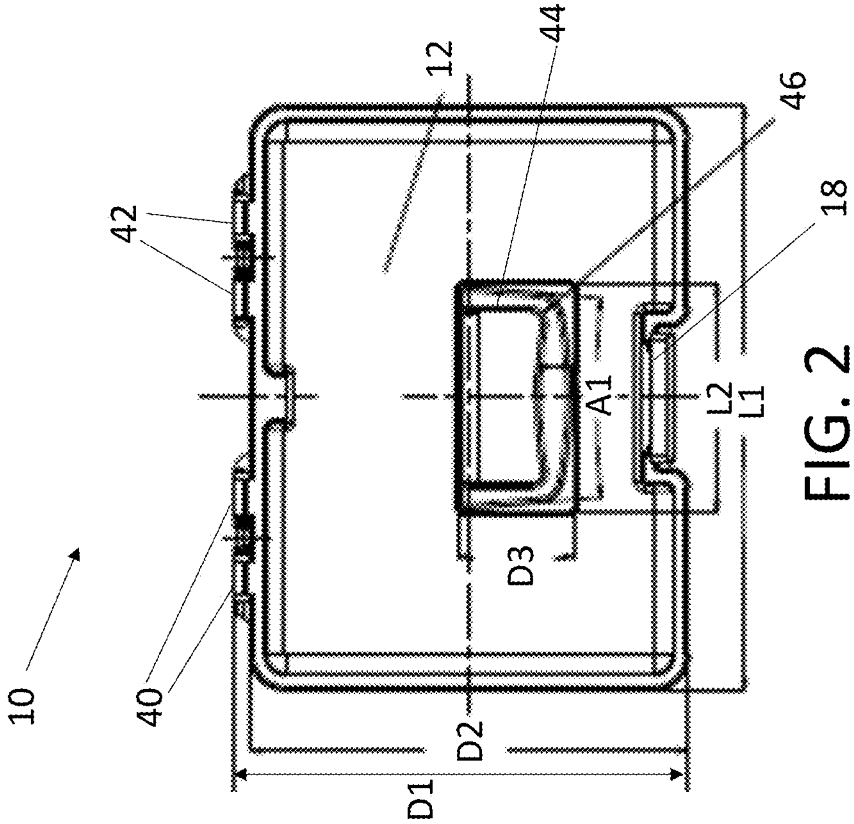
FIG. 2 is a top view of the vibrating liquid disinfectant container of FIG. 1 in a closed position.

Referring to FIG. 2, cover 12 has loops 40, 42 for the rotational connection to box 14. Cover 12 has a depression 44. A handle 46 is rotatably connected to cover 12 in depression 44. Cover 12 can have a length L1 of about 268 millimeters ("mm"), a depth D1 of about 209 mm up to loops 40, 42 and a depth D2 of about 201 mm without loops 40, 42. Depression 44 can have a length L2 of about 106 mm and a depth D3 of about 54 mm. Handle 46 can taper at an angle A1 of about 10 degrees.

Figure 3:
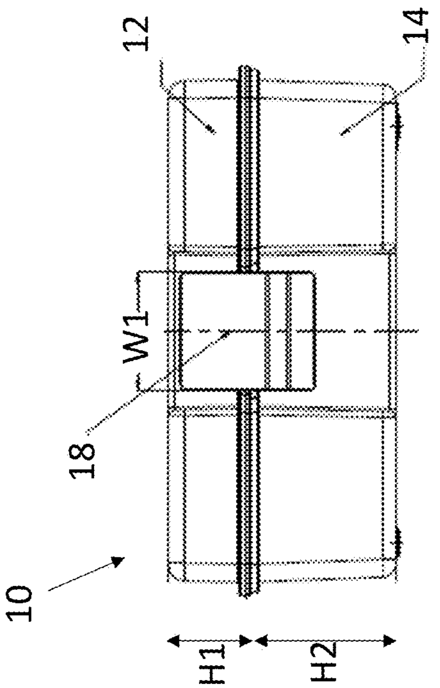
FIG. 3 is a front view of the vibrating liquid disinfectant container of FIG. 1 in the closed position.
Figure 9:
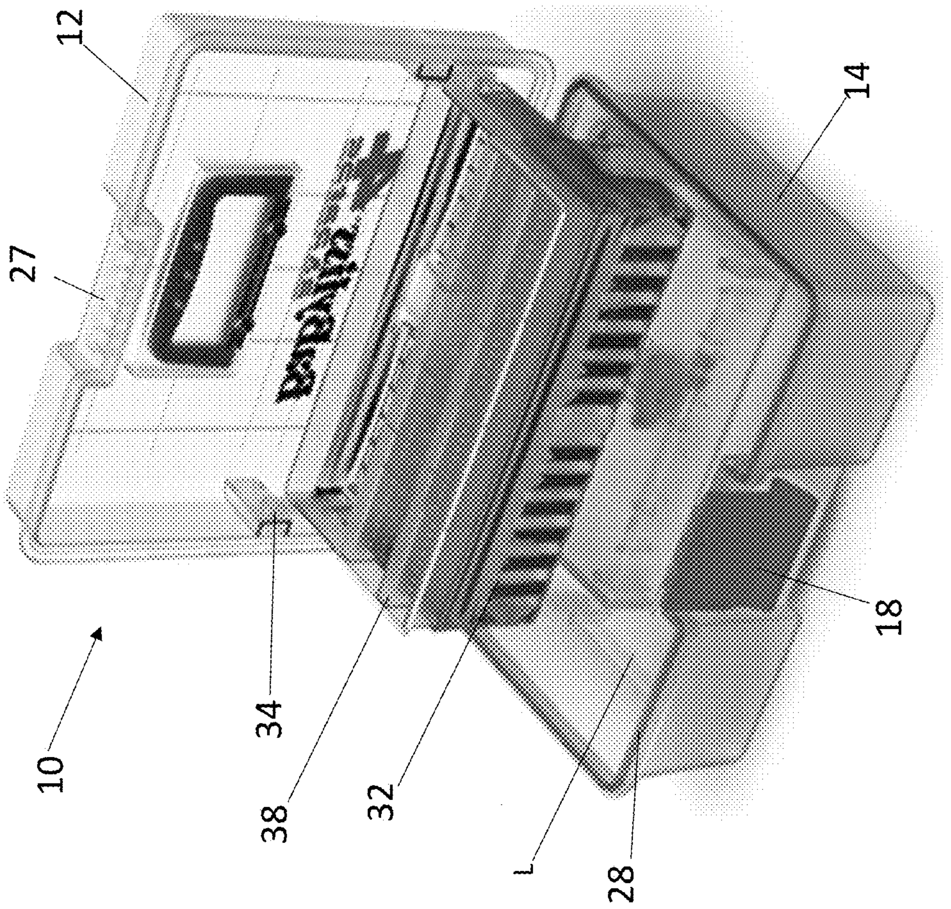
FIG. 9 is a front perspective view of the vibrating liquid disinfectant container of FIG. 1 in the opened position and filled with liquid disinfectant.

Referring to FIG. 3, latch 18 of cover 12 engages ridge 27 of box 14 to maintain container 10 in the closed position, for example, by snap fit or friction fit. Cover 12 can have a height H1 of about 39 mm and box 14 can have a height H2 of about 75 mm. Latch 18 can have a width W1 of about 60 mm. Alternatively, latch 18 can be connected to box 14 and ridge 27 can be formed on cover 12 as shown in FIG. 9.

Figure 5:
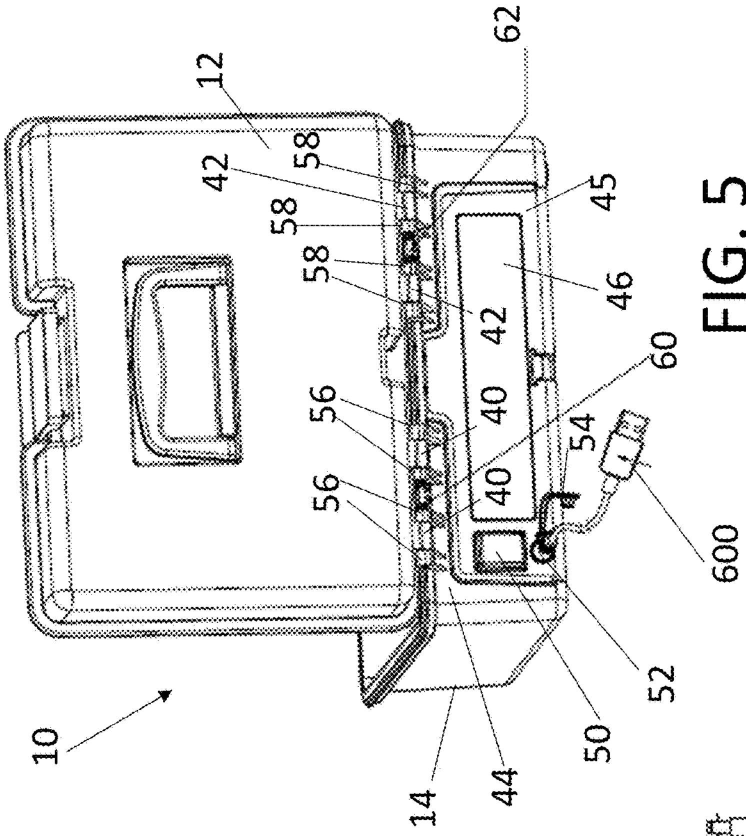
FIG. 5 is a rear perspective view of the vibrating liquid disinfectant container of FIG. 1 in the opened position.
Figure 4:
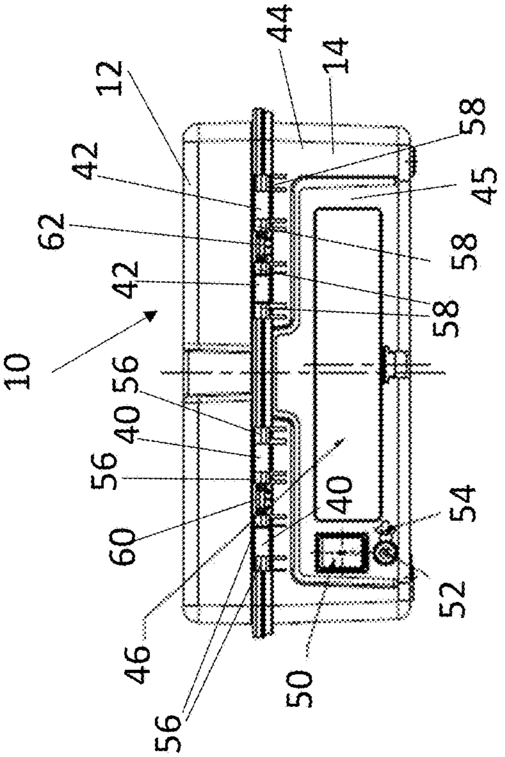
FIG. 4 is a rear view of the vibrating liquid disinfectant container of FIG. 1 in the closed position.

Referring to FIGS. 4 and 5, a rear wall 44 of box 14 is connected to a box back panel 45. A battery door 47 is removably connectable to back panel 45 to cover a battery cavity 49 that receives one or more batteries 48 (FIG. 9). Batteries 48, for example, are 3 size C 1.5 Volt dry cell batteries. Box 14 has a switch cover 50 connected to back panel 45 and an adaptor socket 52 having a rubber cover 54 is connected on back panel 45 of box 14. Loops 56, 58 are formed on rear wall 44 of box 14. One of loops 40 extends between a first loop and a second loop of loops 56 and another of loops 40 extends between a third loop and a fourth loop of loops 56. One of loops 42 extends between a first loop and a second loop of loops 58 and another of loops 42 extends between a third loop and a fourth loop of loops 58. A first axis rod 60 is through loops 56 and loops 40 and a second axis rod 62 is through loop 58 and loops 42 forming the rotational connection between cover 12 and box 14 to rotate between the closed position, as shown in FIG. 4, and the opened position, as shown in FIG. 5.

Figure 6:
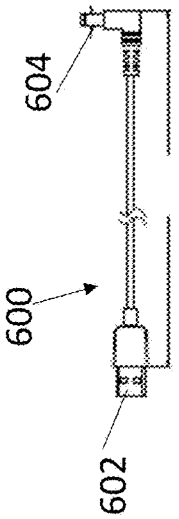
FIG. 6 is a side view of a USB cable.
Figure 7:
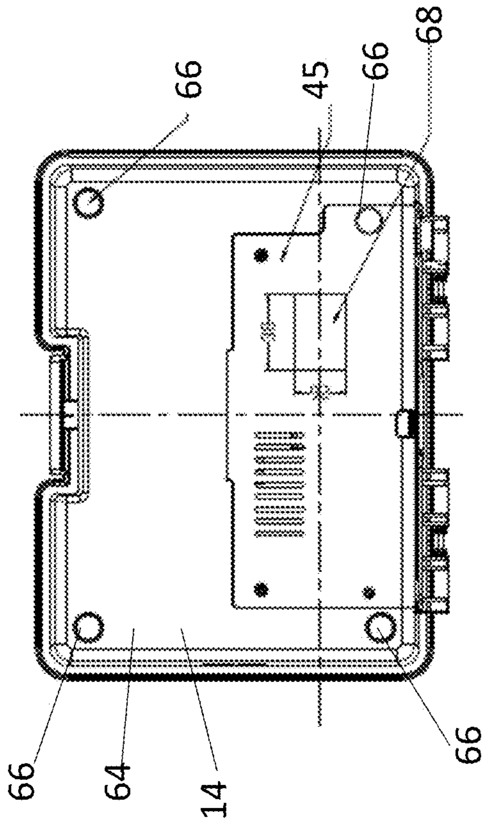
FIG. 7 is a bottom view of the vibrating liquid disinfectant container of FIG. 1 in the closed position.

Referring to FIG. 6, a USB cord 600 has a USB connector 602 and a prong connector 604. Prong connector 604 is removably connectable to adaptor socket 52. Container 10 can be battery powered, where batteries 49 can be disposable or rechargeable, and/or powered by a power source connected to USB cord 600. USB cord 600 can also recharge batteries 48. USB cord 600, for example, is a 5 Volt 1000 milliAmp USB adaptor Referring to FIG. 7, box back panel 45 is connected to rear wall 44 and a bottom wall 64 of box 14. Bottom wall 64 also can have feet 66. Box back panel 45 can have a label 68, for example, that includes a rating mark.

Figure 8:
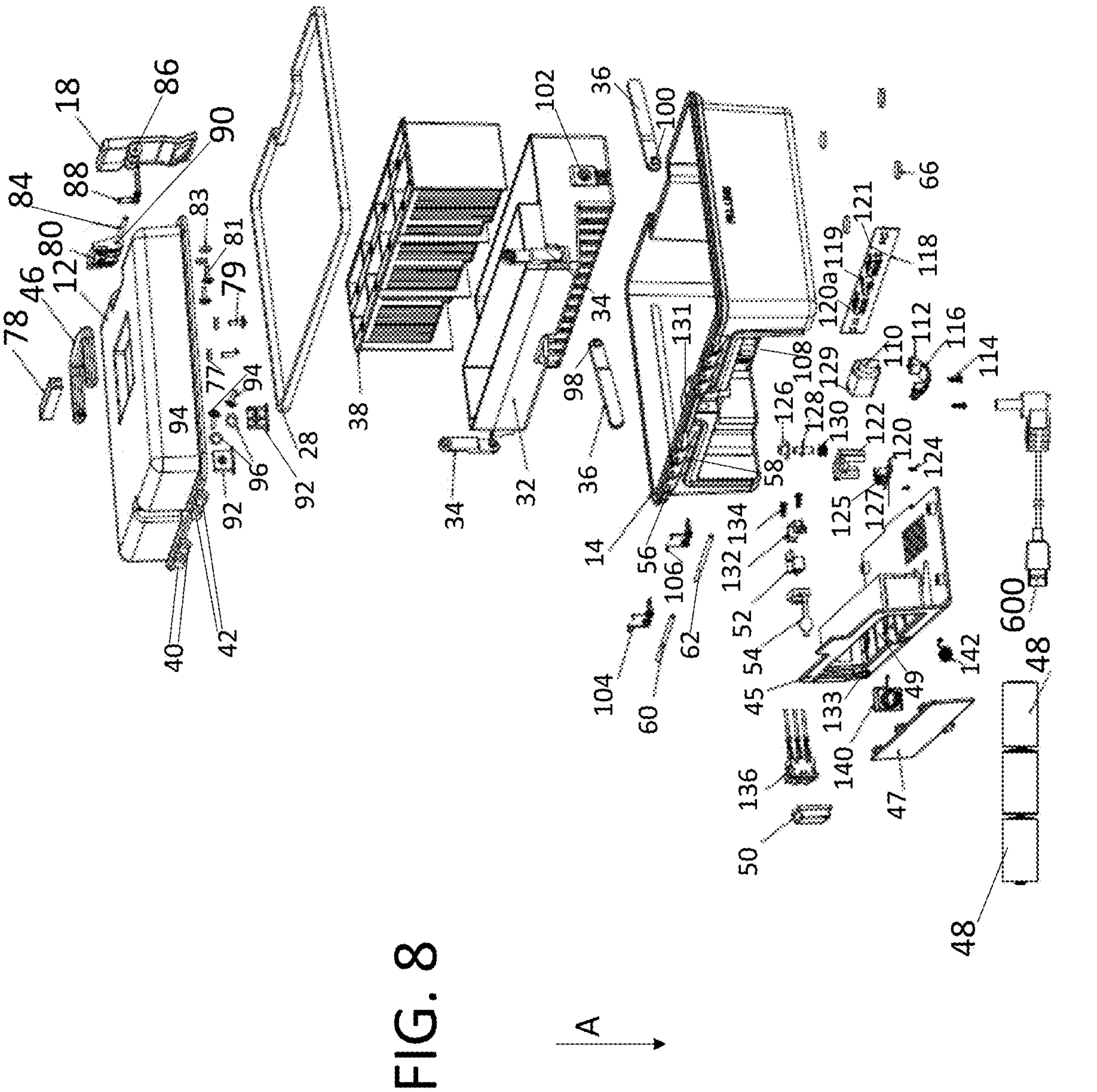
FIG. 8 is a front perspective exploded view of the vibrating liquid disinfectant container of FIG. 1.

Referring to FIG. 8, handle 46 connects to cover 12 by a handle cover 78. Fasteners 79, for example screws, pass through gaskets 77 and cover 12 on opposite sides of handle cover 78 to secure handle 46 between cover 12 and handle cover 78. Latch 18 is connected to cover 12 by a spring bracket 80. Spring bracket 80 is connected to cover 12 by fasteners 81, for example, screws, that pass through gasket 83, spring bracket 80, and cover 12. Latch 18 is connected to spring bracket 80 by an axis 84 that passes through openings 86 in latch 18, through double torsion spring 88 and openings 90 through spring bracket 82. Hinges 34 are connected to cover 12 by fastener assemblies that include hinge fix brackets 92, fasteners 94, for example, screws, and gaskets 96. One of fasteners 94 passes through one of hinges 34, through one of gaskets 96, through one of hinge fix brackets 92 and through cover 12 on a first side of cover 12. Another of fasteners 94 passes through another of hinges 34, through another of gaskets 96, through another of hinge fix brackets 92 and through cover 12 on a second side of cover 12. Gasket 28 can be a foamed cotton material. Hinges 36 can each have a first peg 98 on a first end and a second peg 100 on a second end opposite the first end. First peg 98 of one of hinges 36 fits in a cavity 102 in basket carriage 32 and second peg 100 fits in a cavity in box 14 forming a first hinge connection between cover 12 and basket carriage 32. First peg 98 of another of hinges 36 fits in a cavity that is the same as cavity 102 in an opposite side of basket carriage 32 and second peg 100 fits in a cavity in box 14 in an opposite side forming a second hinge connection between cover 12 and basket carriage 32.

As discussed herein, one of loops 40 extends between a first loop and a second loop of loops 56 and another of loops 40 extends between a third loop and a fourth loop of loops 56. One of loops 42 extends between a first loop and a second loop of loops 58 and another of loops 42 extends between a third loop and a fourth loop of loops 58. First axis rod 60 is through loops 56, a first spring 104, and loops 40 and a second axis rod 62 is through loops 58, a second spring 106, and loops 42 forming the rotational connection between cover 12 and box 14 to rotate between the closed position, as shown in FIG. 4, and the opened position, as shown in FIG. 5. First spring 104 and second spring 106, for example, double torsion springs.

Box 14 forms a cavity 108. A vibration motor 110 is connected to box 14 in cavity 108 by a motor bracket 112 and fasteners 114, for example, screws, that pass through motor bracket 112 and box 14 to connect motor bracket 112 to box 14. Vibration motor 110, for example, is a SFF-130SE 3.6 VDC Speed 4500+10% rpm with 3 g vibration weight. A rubber panel 116 is on motor bracket 112.

A printed circuit board assembly 118 is connected to box 14 in cavity 108. Printed circuit board assembly 118 has light 119, for example, 3 light emitting diodes ("LED"), and housing 120*a*. Light 119 when activated generates light to illuminate liquid in box 14. Printed circuit board assembly 118 can include a controller 121, for example, a microcontroller unit and printed circuit board that controls operation of vibration motor 110 to activate and deactivate vibration motor 110 to generate vibration by selectively providing electric current from batteries 48 and/or USB cord 600 and controls operation of light 119 to activate and deactivate light 119 to generate light by selectively providing electric current from batteries 48 and/or USB cord 600.

A switch assembly 120 that is a tactile switch assembly or tact switch assembly is connected to box 14 in cavity 108 by a cap bracket 122 and fasteners 124, for example, screws, that pass through cap bracket 122 and box 14. Switch assembly 120 has a switch and switch printed circuit board 125, a rocker switch cap 126, a switch 128 and a spring 130. Rocker switch cap 126 extends through an opening 131 through box 14 in an extended position. When cover 12 is in the closed position, as shown in FIG. 3, cover 12 contacts and presses rocker switch cap 126 downward in a direction A to a pressed position, and when cover 12 is in the opened position, as shown in FIG. 1, cover 12 does not contact rocker switch cap 126 and spring 130 biases rocker switch cap 126 in a direction opposite to direction A to the extended position. Switch assembly 120 has a portion 127 that extends to an activating member 129 of vibration motor 110. When cover 12 is in the closed position, cover 12 contacts and presses a first portion of switch assembly 120, namely, rocker switch cap 126, thereby causing portion 127 of switch assembly 120 to engage activating member 129 of vibration motor 110 in order to operate vibration motor 110.

Adaptor socket 52 is connected to box back panel 45 by a bracket 132 and fasteners 134, for example, screws, that pass through box back panel 45 and bracket 132 to position adaptor socket 52 in cavity 108 of box 14. Adaptor socket 52 is connected to box back panel 45 to be aligned with an opening 133 through box back panel 45. Rubber cover 54 is positioned over adaptor socket 52 on an opposite side of box back panel 45 to be outside of cavity 108 of box 14. Switch 136 is connected to box back panel 45 through an opening 138 through box back panel 45. Switch 136 has three positions: "on", "off" and "auto" each, respectively, corresponding to a mode of operation of at least one of vibration motor 110 and light 119. Switch 136, for example, is an override switch RS-1315 15 A 120V, 7.5 A 250V. Switch cover 50 covers switch 136. Battery cavity 49 that receives one or more batteries 48 has battery springs 140, 142 connected on opposite sides of battery cavity 49.

Cover 12, box 14, latch 18, basket carriage 32, accessories basket 38, box back panel 45, and battery door 47 can be plastic, for example, polypropylene ("PP"). Handle 46 can be PP and thermoplastic elastomer ("TPE"). Handle cover 78 can be rubber.

Referring to FIG. 9, during use of container 10, a user provides power to container 10 by batteries 48 and/or USB cord 600 that can be connected to an external power source, for example, an electrical outlet by way of an adapter. The user positions switch 136 in the "auto" position. The user moves container 10 to the opened position, as shown in FIGS. 1 and 9, and fills box 14 up to indicia 30 with disinfectant liquid L (of a type known in the art, for example, Barbicide® concentrate or other disinfectant liquid). The user can place tools, for example, tools for cutting hair such as guards, blades, shears and combs, in basket carriage 32, accessories basket 38, and/or box 14 submerging a portion of or the entirety of the tools in the disinfectant liquid. The user moves cover 12 from the opened position, as shown in FIGS. 1 and 9, to the closed position, as shown in FIG. 3. When cover 12 moves to the closed position, switch assembly 120 is actuated by cover 12 that contacts and presses rocker switch cap 126 downward in a direction A to a pressed position so that portion 127 of switch assembly 120 engages activating member 129 of vibration motor 110 in order to operate vibration motor 110 and the controller, for example, included on printed circuit board assembly 118, commences a predetermined cycle that activates vibration motor 110 to generate vibration in the disinfectant liquid in box 14 for a predetermined time and illuminates light 119 to illuminate the liquid in box 14 for a predetermined time.

The predetermined cycle that is automatically commenced can activate vibration motor 110 to generate vibration for a predetermined time, for example, 1 minute, and then deactivate vibration motor 110 to stop vibration, and the predetermined cycle can activate light 119 to generate light for a predetermined time, for example, 10 minutes, and then deactivate light 119. For example, 1 minute can be enough for generating vibration by vibration motor 110 for a vibration cleaning cycle. A limited time for activation of vibration motor 110, for example, for 1 minute, can also save battery life. In addition, many disinfecting solutions state that the items being disinfected should remain in the bath of disinfecting solution for 10 minutes. Accordingly, light 119 remaining activated for longer than vibration motor 110, for example, activation of vibration motor 110 and light 119 for 1 minute and activation of only light 119 for 10 minutes, can indicate to users that the tools should remain in container 10 while the light 119 remains activated for an additional 9 minutes even if vibration of vibration motor 110 has stopped after 1 minute.

The user can move latch 18 of cover 12 to engage ridge 27 of box 14 to maintain container 10 in the closed position. After the predetermined cycle has finished or when the user wishes to remove the tools in container 10, the user disengages latch 18 of cover 12 from ridge 27 of box 14 and moves cover 12 from the closed position to the opened position so that rocker switch cap 126 moves from the depressed position to the extended position to prevent further operation of vibration motor 110. Once cover 12 is in the opened position, the user can selectively remove the tools.

The controls of the controller also include moving switch 136 to the "on" position and the "off" position as overrides, otherwise, the lowering of cover 12 to the closed position activates the vibration of vibration motor 110 and illuminates light 119 as a light for the predetermined cycle. Moving switch 136 to the "off" position prevents operation of vibration motor 110. Moving switch 136 to the "on" position operates vibration motor 110 to generate vibration when rocker switch cap 126 of switch assembly 120 is moved to the pressed position by cover 12 being moved to the closed position so that vibration motor 110 is activated until cover 12 is moved to the opened position or switch 136 is moved to the "off" position. To make sure cover 12 is in the closed position before the vibration of vibration motor 110 starts, rocker switch cap 126 of switch assembly 120 is moved to the pressed position by cover 12 being moved to the closed position to automatically activate vibration motor 110 and/or automatically commence the predetermined cycle. The LED light of light 119 is for illumination only and does not provide UV.

Accessories basket 38 is in basket carriage 32. Accessories basket 38 is designed for clipper comb guards, for example, half through six size, to fit 8 guards in total. The reason accessories basket 38 is removable is so the user can take it out and keep the clipper comb guards organized. A compartment 144 that is a space behind accessories basket 38 has fluid of the disinfectant liquid flowing into it and is large enough to receive hair combs and shears. Further, indicia 30 form a fill line and gasket 28 prevent fluid of the disinfectant liquid from coming out when cover 12 is closed.

Accordingly, container 10 provides a disinfectant liquid cleaning box that is fillable with a disinfectant liquid and vibrates to enhance cleaning. Container 10 generates sonic vibrations to help release dirt particles, hair, grime, and other foreign particles. Container 10 also has light 119, for example, a LED, illuminated cleaning cycle. The cleaning cycle can be automated so that the cleaning cycle is activated automatically when container 10 moves from an opened position to a closed position, and once completed, then the cleaning cycle is deactivated automatically.

It should also be noted that the terms "first", "second", "third", "upper", "lower", and the like may be used herein to modify various elements. These modifiers do not imply a spatial, sequential, or hierarchical order to the modified elements unless specifically stated. Also, the term "attached" may also mean connected.

While the present disclosure has been described with reference to one or more exemplary embodiments, it will be understood by those skilled in the art that various changes may be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure is not limited to the particular embodiment(s) disclosed as the best mode contemplated, but that the disclosure will include all embodiments falling within the scope of the appended claims.

What is claimed is:

1. A disinfectant liquid cleaning box comprising:

a box having an interior space formed therein to receive contents to be cleaned and a cleaning liquid;

an opening at the top of the box being in communication with said interior space;

a cover rotatably connected to the box and adapted to be selectively moved between an opened position and a closed position in order to open and close the interior space of the box;

a vibration motor connected to the box for causing vibration of said cleaning liquid;

a light connected to the box, the light when activated generates light to illuminate cleaning liquid in the box, the light is for illumination only and does not provide UV; and a controller that controls a predetermined cycle to activate the vibration motor for a first predetermined time to disinfectant contents to be cleaned that are placed in the interior space of the box and to activate the light for a second predetermined time that is longer than the first predetermined time.

2. The disinfectant liquid cleaning box of claim 1, wherein the predetermined cycle is commenced when the cover moves from said opened position to said closed position.

3. The disinfectant liquid cleaning box of claim 1, further comprising at least one battery in said box;

and a USB cord that is connectable to the box to charge said at least one battery.

4. The disinfectant liquid cleaning box of claim 1, further comprising a basket carriage that is connected to an interior surface of the cover and an inner surface of the box to extend into said interior space of the box.

5. The disinfectant liquid cleaning box of claim 4, further comprising an accessories basket that is removably insertable in the basket carriage.

6. The disinfectant liquid cleaning box of claim 1, wherein the light comprises three light emitting diodes that generate light to illuminate liquid in the box.

7. The disinfectant liquid cleaning box of claim 2, further comprising a switch assembly that is actuated when the cover moves from the opened position to the closed position.

8. The disinfectant liquid cleaning box of claim 7, wherein the switch assembly is connected to the box so that a first portion of the switch assembly extends through another opening in the box to an extended position, and a second portion of the switch assembly extends to an activating member of the vibration motor.

9. The disinfectant liquid cleaning box of claim 8, wherein, when the cover is in the closed position, the cover contacts and presses the first portion of the switch assembly thereby causing the second portion of the switch assembly to engage the activating member of the vibration motor in order to operate the vibration motor.

10. The disinfectant liquid cleaning box of claim 9, wherein, when the cover is in the opened position, the cover does not contact the first portion of the switch assembly and, thus, does not cause activation of said vibration motor or enable operation of said vibration motor.

11. The disinfectant liquid cleaning box of claim 10, further comprising a mode of operation switch connected to the box that has three positions: “on”, “off” and “auto”, each, respectively, corresponding to a mode of operation of at least one of said vibration motor and said light.

12. The disinfectant liquid cleaning box of claim 11, wherein positioning the mode of operation switch in the “on” position overrides the predetermined cycle.

13. The disinfectant liquid cleaning box of claim 12, wherein positioning the mode of operation switch in the “off” position overrides the predetermined cycle.

14. The disinfectant liquid cleaning box of claim 13, wherein the first predetermined time is shorter than the second predetermined time.

15. The disinfectant liquid cleaning box of claim 13, wherein the first predetermined time is one minute.

16. The disinfectant liquid cleaning box of claim 13, wherein the second predetermined time is ten minutes.

17. The disinfectant liquid cleaning box of claim 11, wherein, when the mode of operation switch in the “off” position, the operation of vibration motor is prevented.

18. The disinfectant liquid cleaning box of claim 11, wherein when the mode of operation switch is in the “on” position, the vibration motor is operated to generate vibration when the cover is in the closed position; and the vibration motor is deactivated to stop vibration when the cover is moved to the opened position or when the switch is moved to the “off” position.

19. The disinfectant liquid cleaning box of claim 5, wherein the accessories basket is sized to hold clipper comb guards.

20. The disinfectant liquid cleaning box of claim 5, wherein the basket carriage has a compartment that is a space behind the accessories basket that is sized to receive one or more hair combs and shears and that is in fluid communication with the interior space such that said cleaning liquid fills said compartment.

* * * * *